(12) United States Patent
Katahira

(10) Patent No.: US 11,695,880 B2
(45) Date of Patent: Jul. 4, 2023

(54) INFORMATION PROCESSING METHOD AND INFORMATION PROCESSING APPARATUS TO DISPLAY AN IMAGE THAT IS A CAPTURED IMAGE ON WHICH ELECTRONIC INFORMATION IS SUPERIMPOSED

(71) Applicant: CANON KABUSHIKI KAISHA, Tokyo (JP)

(72) Inventor: Yuka Katahira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/132,757

(22) Filed: Dec. 23, 2020

(65) Prior Publication Data

US 2021/0203789 A1 Jul. 1, 2021

(30) Foreign Application Priority Data

Dec. 27, 2019 (JP) .............................. JP2019-239134

(51) Int. Cl.
*H04N 1/00* (2006.01)

(52) U.S. Cl.
CPC ..... *H04N 1/00029* (2013.01); *H04N 1/00039* (2013.01); *H04N 1/00307* (2013.01); *H04N 1/00411* (2013.01); *H04N 1/00543* (2013.01)

(58) Field of Classification Search
CPC ....................... H04N 1/00029; H04N 1/00307
See application file for complete search history.

(56) References Cited

U.S. PATENT DOCUMENTS

| | | | | |
|---|---|---|---|---|
| 2012/0189188 A1* | 7/2012 | Nagai | ................ | H05K 13/0815 382/145 |
| 2013/0114100 A1* | 5/2013 | Torii | ................... | H04N 1/00037 358/1.14 |
| 2019/0007562 A1* | 1/2019 | Sato | ..................... | H04N 1/00037 |
| 2020/0302172 A1* | 9/2020 | Yoda | ....................... | G06V 20/20 |
| 2020/0389564 A1* | 12/2020 | Kodimer | ................. | G06F 18/22 |

FOREIGN PATENT DOCUMENTS

JP 2011245792 A 12/2011

* cited by examiner

*Primary Examiner* — Benjamin O Dulaney
(74) *Attorney, Agent, or Firm* — Canon U.S.A., Inc. IP Division

(57) ABSTRACT

An information processing method including: acquiring a superimposed image in which electronic information corresponding to an image of an object captured by an image capturing unit of an information processing apparatus is superimposed on the image; storing the superimposed image in a storage; and displaying the superimposed image stored in the storage on a display of the information processing apparatus, and even in a case where the object is not included in an image capturing range of the image capturing unit, the superimposed image stored in the storage is displayed on the display.

15 Claims, 10 Drawing Sheets

INFORMATION PROCESSING METHOD AND INFORMATION PROCESSING APPARATUS TO DISPLAY AN IMAGE THAT IS A CAPTURED IMAGE ON WHICH ELECTRONIC INFORMATION IS SUPERIMPOSED

BACKGROUND

Field of the Disclosure

The present disclosure relates to a technology to display an image that is a captured image on which electronic information is superimposed.

Description of the Related Art

There is an augmented reality (AR) technology to augment information on a real environment by displaying a captured image obtained by performing image capturing in the real environment, on which electronic information is superimposed.

Japanese Patent Laid-Open No. 2011-245792 has described a method of, in a case where a manual work operation is necessary in an image forming apparatus, acquiring a captured video image of the image forming apparatus and displaying the video image on which electronic information is superimposed, which indicates work contents corresponding to the image forming apparatus on the video image.

There is an information processing apparatus comprising both an image capturing unit and a display unit, such as a smartphone or a tablet. In a case where a user places down the information processing apparatus in order to perform the work with both hands in accordance with instructions on the image on which electronic information is superimposed, which is displayed on the display unit of the information processing apparatus such as this, it may happen that the object deviates from the image capturing range of the image capturing unit in the information processing apparatus. In a case where the object deviates from the image capturing range of the image capturing unit, the electronic information indicating the work instructions is no longer displayed on the display unit of the information processing apparatus. Because of this, there is a concern that the work efficiency of a user is reduced.

SUMMARY

An object of the present disclosure is to display an image in which electronic information is superimposed on an object irrespective of the posture of the information processing apparatus.

The information processing method of the present disclosure includes: acquiring a superimposed image in which electronic information corresponding to an image of an object captured by an image capturing unit of an information processing apparatus is superimposed on the image; storing the superimposed image in a storage; and displaying the superimposed image stored in the storage on a display of the information processing apparatus, and even in a case where the object is not included in an image capturing range of the image capturing unit, the superimposed image stored in the storage is displayed on the display.

Further features of the present disclosure will become apparent from the following description of exemplary embodiments with reference to the attached drawings.

DESCRIPTION OF THE EMBODIMENTS

In the following, embodiments are explained by using the drawings. The configurations shown in the following embodiments are merely exemplary and the embodiments are not limited to the configurations shown schematically. Further all combinations of features explained in the present embodiments are not necessarily indispensable to the solution of the present disclosure.

First Embodiment

[About Work Instruction System]

Figure 1:
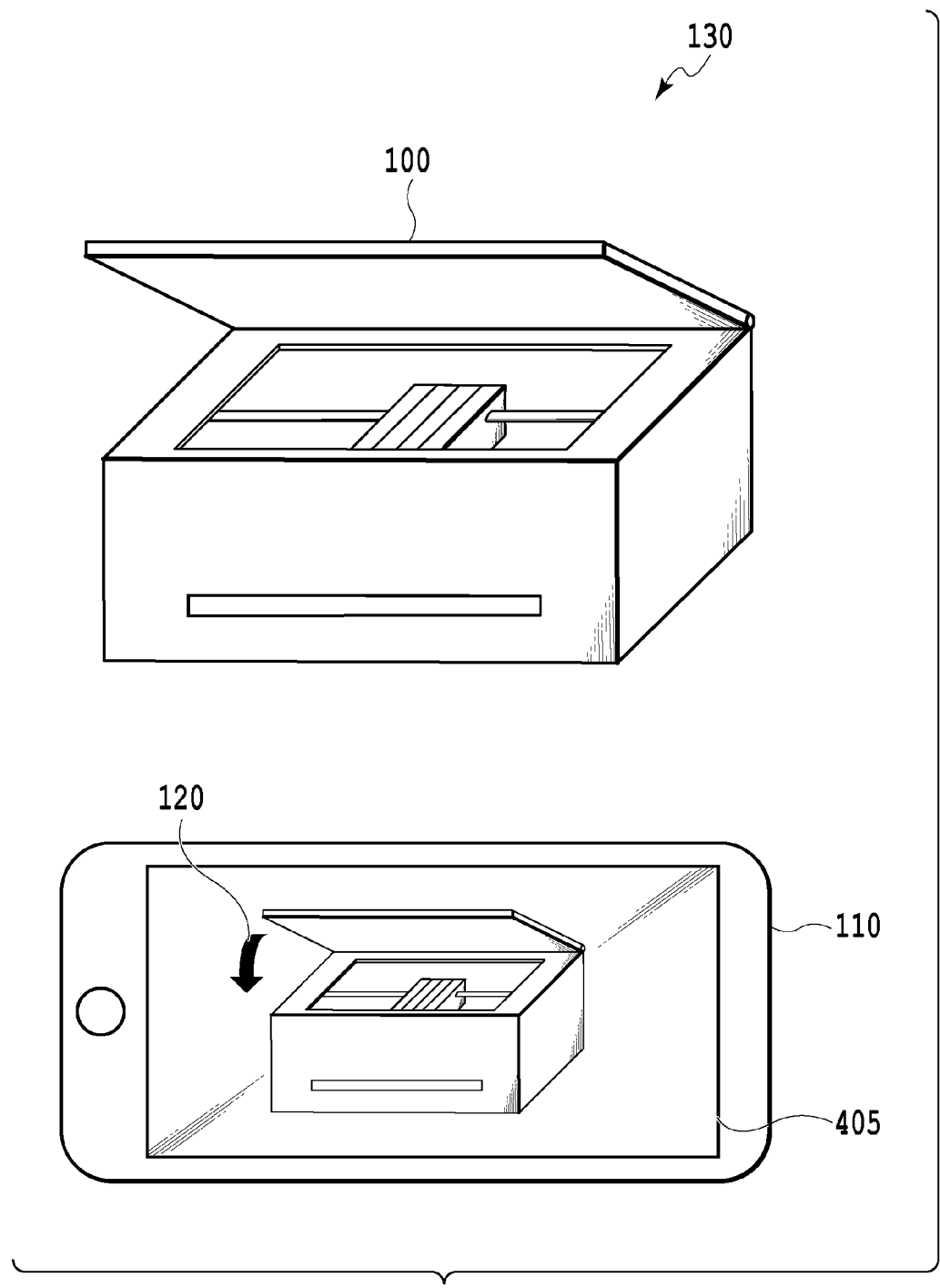
FIG. 1 is a diagram showing a configuration of a work instruction system.

FIG. 1 is a diagram showing a configuration of a work instruction system of the present embodiment. A work instruction system 130 has an image forming apparatus 100 and a multi function mobile telephone 110.

The image forming apparatus 100 is, for example, a printer and a device that is the object of work by a user (hereinafter, described as work-target object) in the present embodiment. The multi function mobile telephone 110 (hereinafter, described as smartphone) is an information processing apparatus having both an image capturing unit 404 (not shown schematically in FIG. 1) and a display unit 405, The information processing apparatus of the work instruction system 130 may be, for example, a tablet, a note PC or the like, which has an image capturing unit, other than a smartphone.

In a case where an event has occurred in the image forming apparatus 100, which requires manual work by a user, a user captures the image forming apparatus 100 in an AR reproduction mode of the smartphone 110. In that case, on the display unit 405 of the smartphone 110, an image is displayed that is a captured image captured by the image capturing unit 404 on which electronic information 120 indicating work contents is superimposed. Further, in a case where a user moves the smartphone 110 and captures the image forming apparatus 100 from a different position and direction, electronic information indicating work contents corresponding to the captured image of the image forming apparatus 100, which is captured from the position after the movement, is displayed by being superimposed on the captured image.

Because of this, in the work instruction system 130, it is possible for a user to easily grasp the work by viewing the image of the image forming apparatus 100 from the position and direction at which and from which the user desires to check the work contents, and therefore, it is possible to improve work efficiency.

However, in a case where the image forming apparatus 100 deviates from the image capturing range of the image capturing unit 404 of the smartphone 110, on the display unit 405 of the smartphone 110, the image forming apparatus 100 is no longer displayed, and therefore, there is a case where the electronic information indicating work contents is not superimposed.

Figure 2:
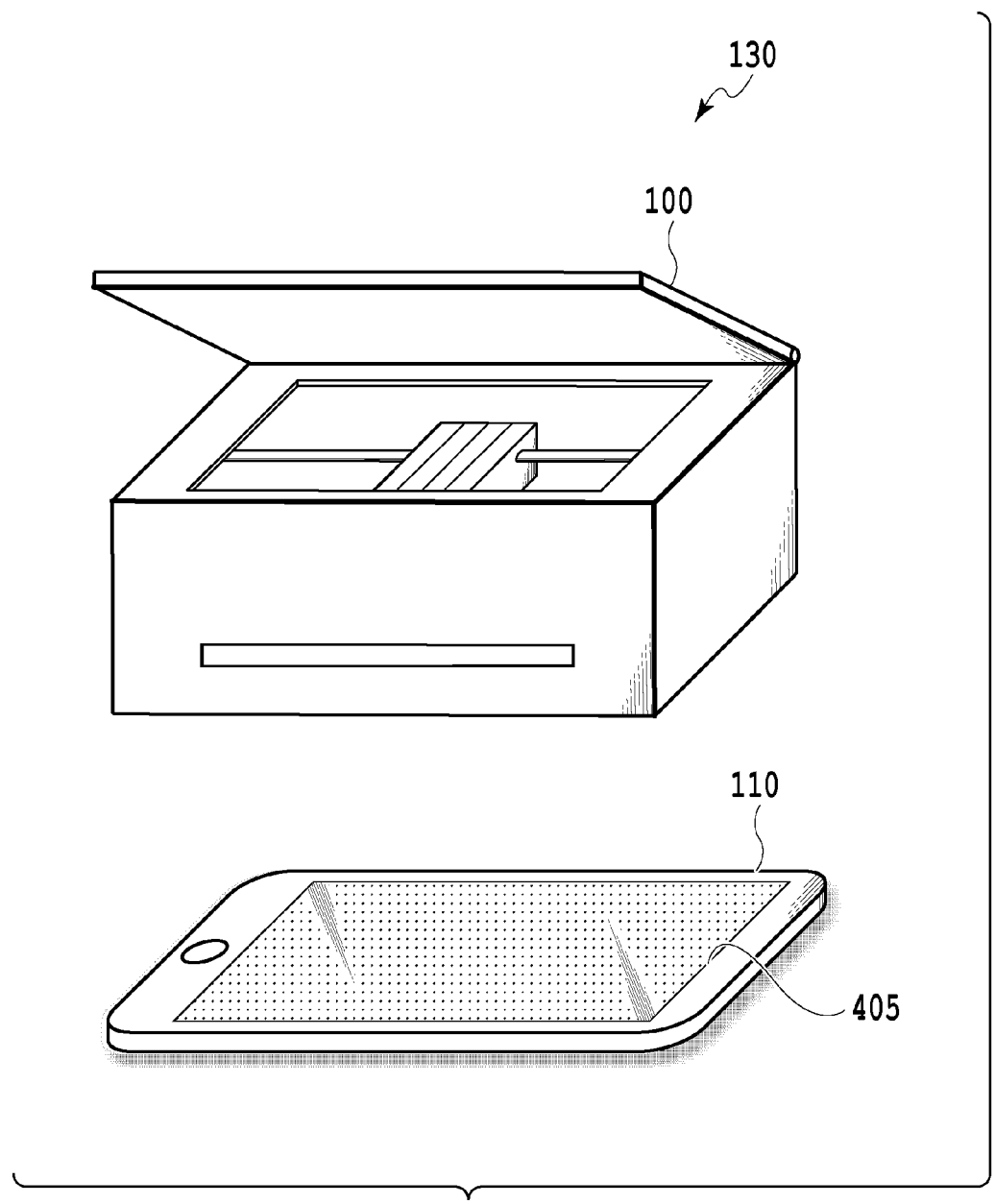
FIG. 2 is a diagram showing a comparison example of a multi function mobile terminal.

FIG. 2 is a diagram showing a comparison example of the present embodiment in a case where a user places down the smartphone 110 for the work. The image capturing unit 404 (not shown schematically in FIG. 2) of the smartphone 110 is located at the back of the display unit 405, and therefore, in a case where a user places down the smartphone 110 and tries to start work while viewing work contents, on the display unit 405, the image forming apparatus 100 is no longer displayed. Because of this, the electronic information indicating the work contents is no longer superimposed, and therefore, it is no longer possible for a user to check the work.

Consequently, in the present embodiment, a superimposed image is generated and stored, which is an image (moving image) including the image forming apparatus 100 on which electronic information in accordance with the state of the image forming apparatus 100 is superimposed. Then, the stored superimposed image is displayed on the display unit 405 of the smartphone 110 in such a manner that the superimposed image is reproduced repeatedly. A method is explained that enables a user to view a superimposed image indicating work contents irrespective of the posture of the smartphone 110 in this manner.

[Hardware Configuration]

Figure 3:
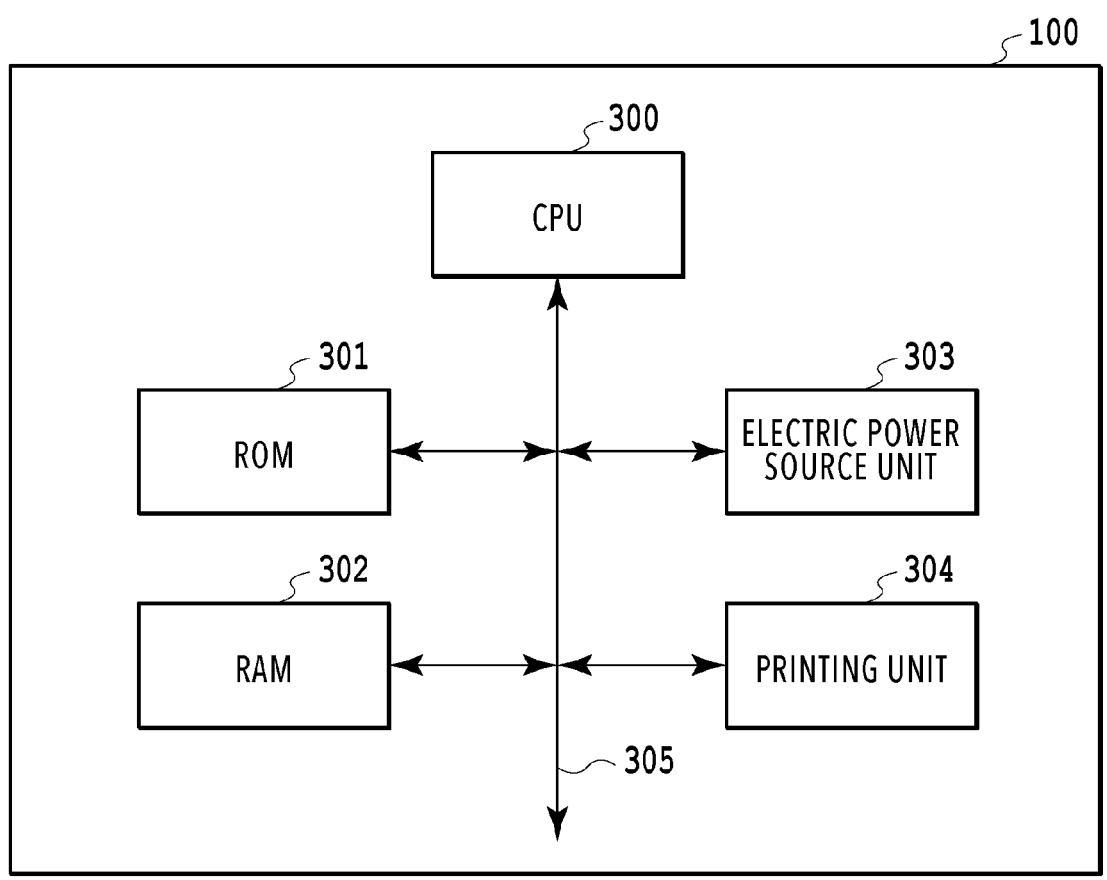
FIG. 3 is a block diagram showing a hardware configuration of an image forming apparatus.

FIG. 3 is a block diagram showing a hardware configuration of the image forming apparatus 100. The image forming apparatus 100 has a CPU 300, a ROM 301, a RAM 302, an electric power source unit 303, a printing unit 304, and a system bus 305, Each unit is connected via the system bus 305.

The CPU 300 performs control of the image forming apparatus 100, for example, such as generates a print job for the printing unit 304 to perform printing by using the RAM 302 as a work area, in accordance with programs stored in the ROM 301, The electric power source unit 303 supplies power necessary for each unit via the system bus 305. The printing unit 304 performs printing in accordance with the generated print job.

Figure 4:
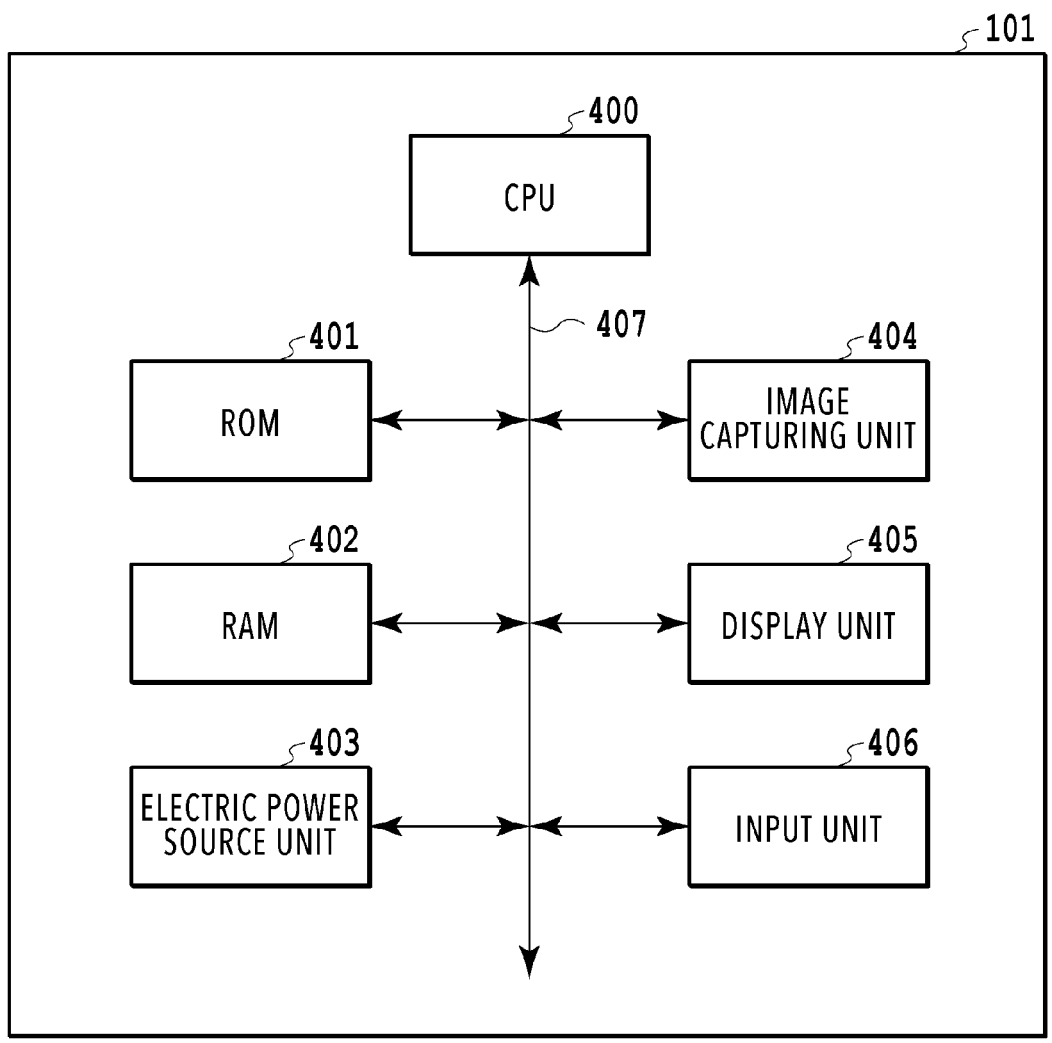
FIG. 4 is a block diagram showing a hardware configuration of the multi function mobile terminal.

FIG. 4 is a block diagram showing a hardware configuration of the smartphone 110. The smartphone 110 has a CPU 400, a ROM 401, a RAM 402, an electric power source unit 403, the image capturing unit 404, the display unit 405, an input unit 406, and a system bus 407.

The CPU 400 performs control of the smartphone 110 by using the RAM 402 as a work area in accordance with programs stored in the ROM 401. The electric power source unit 403 supplies power necessary for each unit via the system bus 407. The image capturing unit 404 is a camera and performs image capturing in accordance with the control of the CPU 400. The display unit 405 is, for example, a liquid crystal panel and displays an image captured by the image capturing unit 404. The input unit 406 receives the input of a user operation, Explanation is given on the assumption that the input unit 406 of the present embodiment is a touch panel and a button.

[Function Configuration of Multi Function Mobile Telephone]

Figure 5:
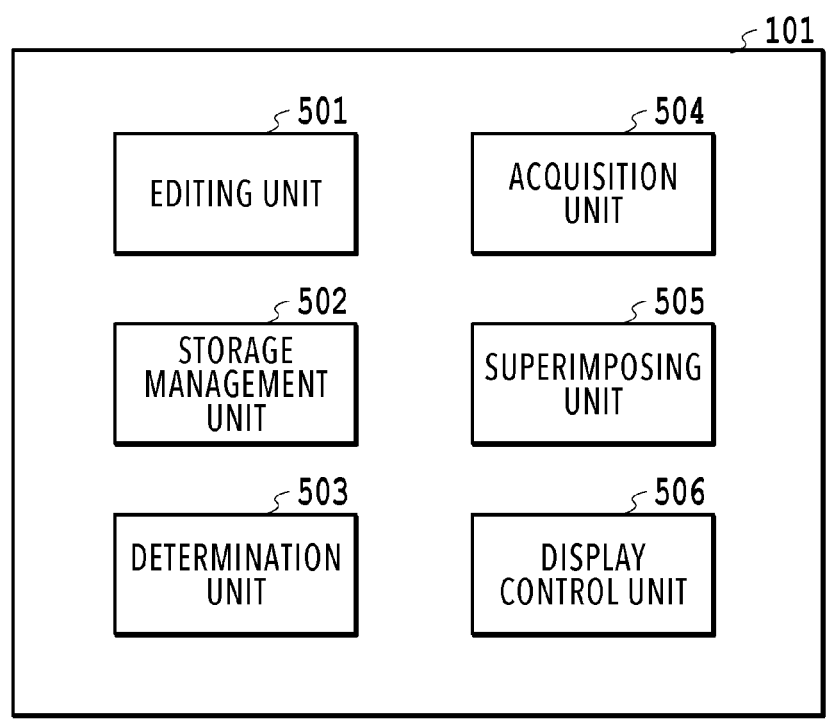
FIG. 5 is a block diagram showing a function configuration of the multi function mobile terminal.

FIG. 5 is a diagram for explaining a function configuration relating to the AR reproduction mode of the smartphone 110. The smartphone 110 has an editing unit 501, a storage management unit 502, a determination unit 503, an acquisition unit 504, a superimposing unit 505, and a display control unit 506.

The editing unit 501 cuts out a part of a moving image obtained by the image capturing unit 404 performing image capturing. The part is a moving image corresponding to several seconds of the captured moving image. That is, the part is a part of frames of a plurality of frames configuring the moving image. It may also be possible for the editing unit 501 to cut out one frame of the moving image obtained by the image capturing unit 404 performing image capturing as a part of images. The storage management unit 502 stores data in the RAM 402.

The determination unit 503 determines the state of a work-target object captured by the image capturing unit 404. For example, the determination unit 503 compares image data on the image forming apparatus 100 in the normal state (state not abnormal), which is stored in the ROM 401 or the RAM 402, and image data obtained by being cut out by the editing unit 501. The determination unit 503 determines the state of the work-target object based on the different point obtained as a result of the comparison.

The acquisition unit 504 acquires electronic information indicating the work contents of a user stored in the ROM 401, Alternatively, it may also be possible for the acquisition unit 504 to acquire electronic information from an external storage apparatus. The superimposing unit 505 generates a superimposed image by superimposing the electronic information and the cut-out image. The display control unit 506 displays the generated superimposed image on the display unit 405.

The processing of the present embodiment may be performed by an AR application comprising the functions of those from the editing unit 501 to the display control unit 506 in FIG. 5 being installed in the smartphone 110.

The function of each unit in FIG. 5 is implemented by the CPU of the smartphone 110 loading the program code stored in the ROM onto the RAM and executing the program code. Alternatively, part or all of the functions of each unit in FIG. 5 may be implemented by hardware, such as an ASIC and an electronic circuit.

[About AR Reproduction Mode of the Present Embodiment]

The smartphone 110 of the present embodiment has the AR reproduction mode in which in a case where a user captures a work-target object, an image obtained by the image capturing on which electronic information indicating work contents is superimposed is displayed. In the AR reproduction mode of the present embodiment, for example, from a moving image of the image forming apparatus 100, which is captured by the smartphone 110, a moving image corresponding to several seconds is cut out. Then, the cut-out moving image on which electronic information indicating work instructions is superimposed (called superimposed image) is displayed on the display unit 405 in such a manner that the moving image is reproduced repeatedly. The superimposed image may be a moving image or a still image. Further, explanation is given by assuming that images includes moving images.

In a case where a user completes the work shown by the superimposed image currently being displayed in such a manner that the superimposed image is reproduced repeatedly, or in case where a user desires to check the work contents from a different angle, it is also possible to update the superimposed image in accordance with the operation of the user. Further, it is also possible to switch the AR reproduction mode to the normal image capturing mode by the operation of the user.

Figure 6A:
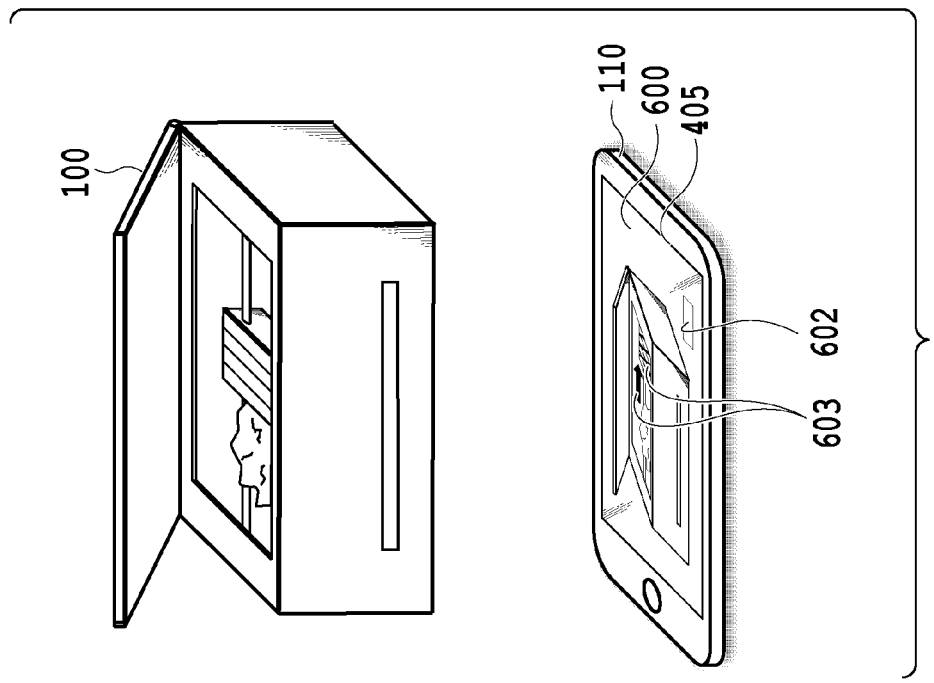
FIGS. 6A and 6B are each a diagram showing the multi function mobile terminal that is performing image capturing in an AR reproduction mode.

FIG. 6A is a diagram explaining the operation in the AR reproduction mode of the present embodiment. The image forming apparatus 100 in FIG. 6A is in a state where a maintenance cover 101 is open and inside the image forming apparatus 100, a sheet 601 is caught in a print head 102 and a paper-jamming has occurred.

The image forming apparatus 100 in the state where the abnormality such as this has occurred is captured by the image capturing unit 404 of the smartphone 110. On the display unit 405 of the smartphone 110, a superimposed image 600 is displayed that is an image captured by the image capturing unit 404 of the smartphone 110 on which an image that is electronic information 603 indicating work contents is superimposed.

Figure 6B:
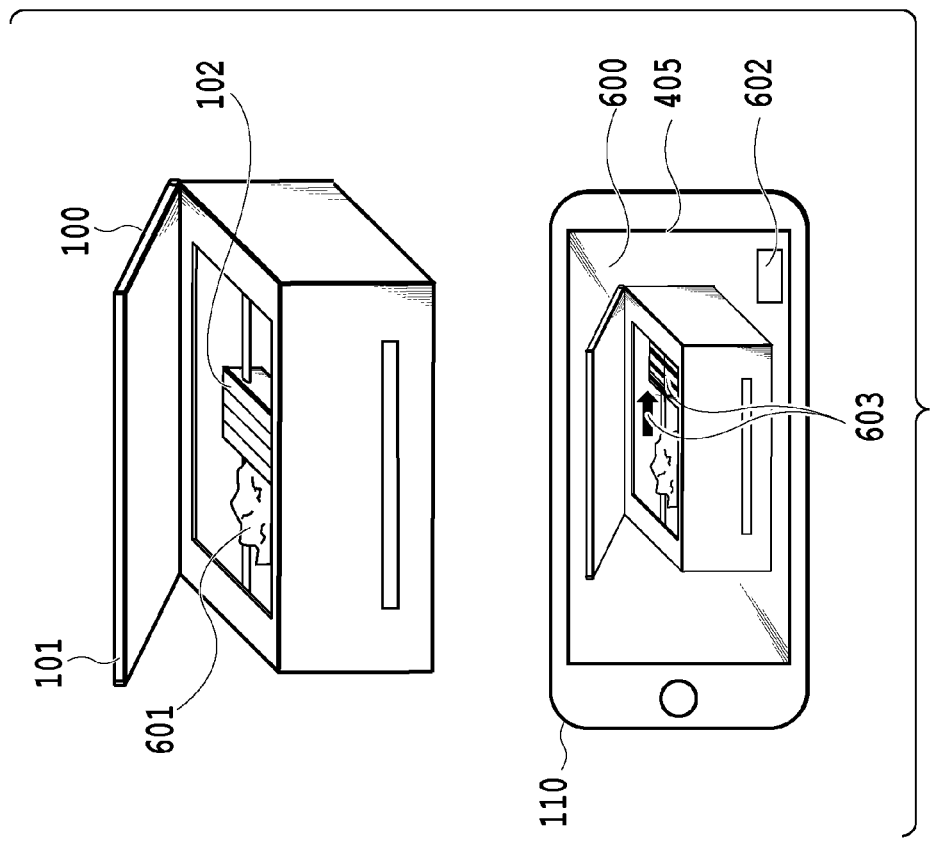

FIG. 6B is a diagram in which the smartphone 110 in the state in FIG. 6A is placed on a floor. The superimposed image 600 that is displayed in the AR reproduction mode of the present embodiment is displayed in such a manner that the superimposed image in which the electronic information is superimposed on the acquired image of the work-target object is reproduced repeatedly. Because of this, as shown in FIG. 6B, even in a case where the image forming apparatus 100, which is the work-target object, deviates from the image capturing range of the image capturing unit 404, it is possible to continue to display the superimposed image showing the work contents on the display unit 405.

On the display unit 405, in addition to the superimposed image 600, a UI image of an update button 602 is displayed. The update button 602 may be located at any position on the display unit 405 or may be a part of the input unit 406. It is possible for a user to update the superimposed image that is displayed repeatedly to a superimposed image based on a new captured image by pressing down the update button 602. Because of this, in a case where a user completes the work of the work contents shown by the superimposed image currently being displayed, by the user pressing down the update button 602, it is possible for the display control unit 506 to display a superimposed image based on a new captured image on the display unit 405. Alternatively, in a case where it is desired to view an image from another angle different from that of the superimposed image showing the work instructions currently being reproduced, by the user pressing down the update button 602, it is possible for the display control unit 506 to display a superimposed image based on a new captured image on the display unit 105.

In the work instruction system 130 of the present embodiment, the contents of work that the work instruction system 130 can instruct a user to perform are not limited to the work for a paper-jamming Even in a case an event has occurred that requires work other than elimination of a paper-jamming in the image forming apparatus 100, it is possible to apply the present embodiment to the work instruction system 130.

Figure 7:
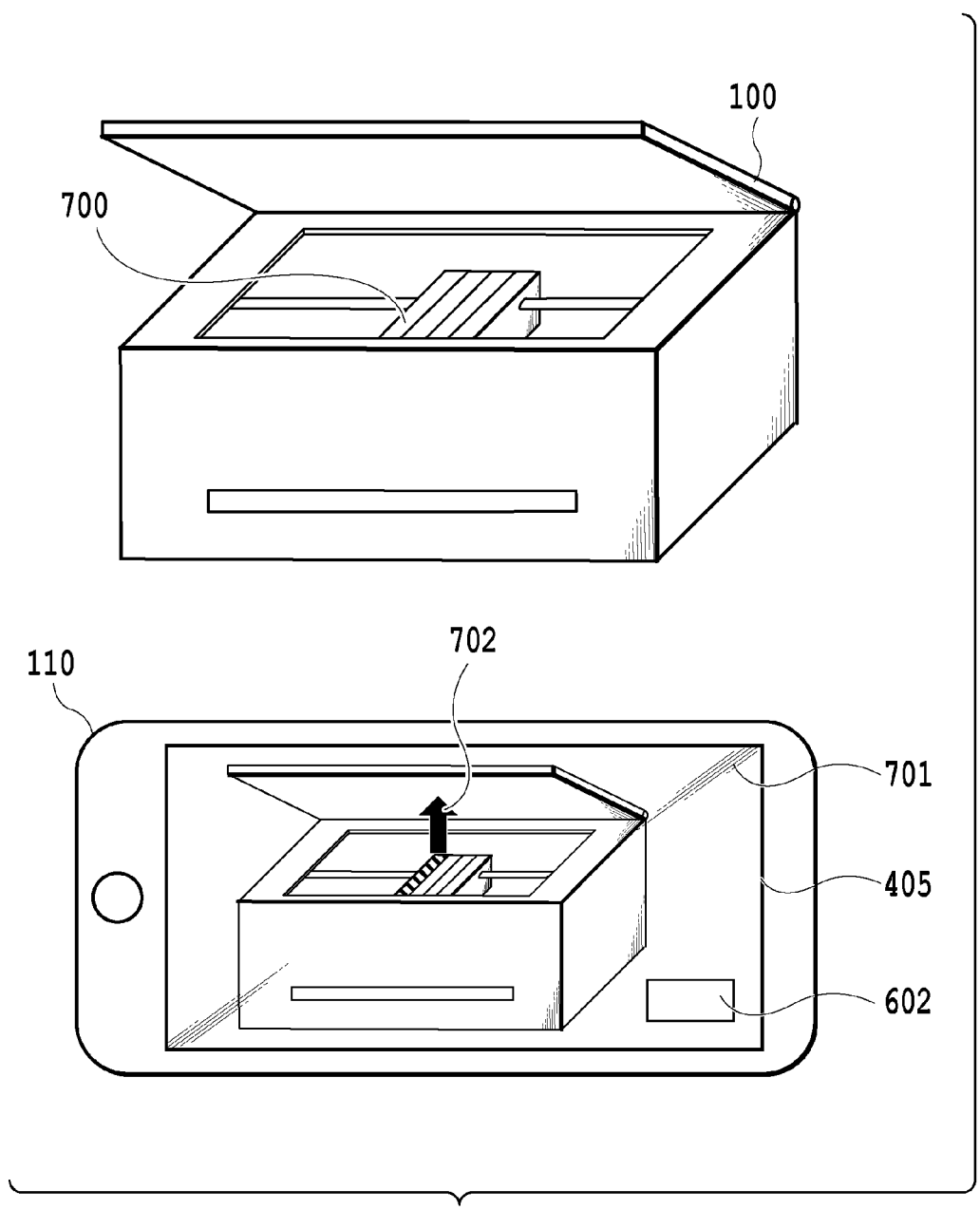
FIG. 7 is a diagram showing the multi function mobile terminal that is performing image capturing in the AR reproduction mode.

FIG. 7 is a diagram showing the image forming apparatus 100 in a case where an exchange error has occurred in an ink tank 700 in the image forming apparatus 100 and a superimposed image 701 in which electronic information 702 is superimposed on an image obtained by capturing the image forming apparatus 100, As shown in FIG. 7, also in a case where the manual work to exchange ink tanks is necessary, it is possible to display the superimposed image 701 in which the electronic information 702 indicating the work contents of a user for ink exchange is superimposed in such a manner that the superimposed image 701 is reproduced repeatedly.

[Processing in AR Reproduction Mode]

Figure 8:
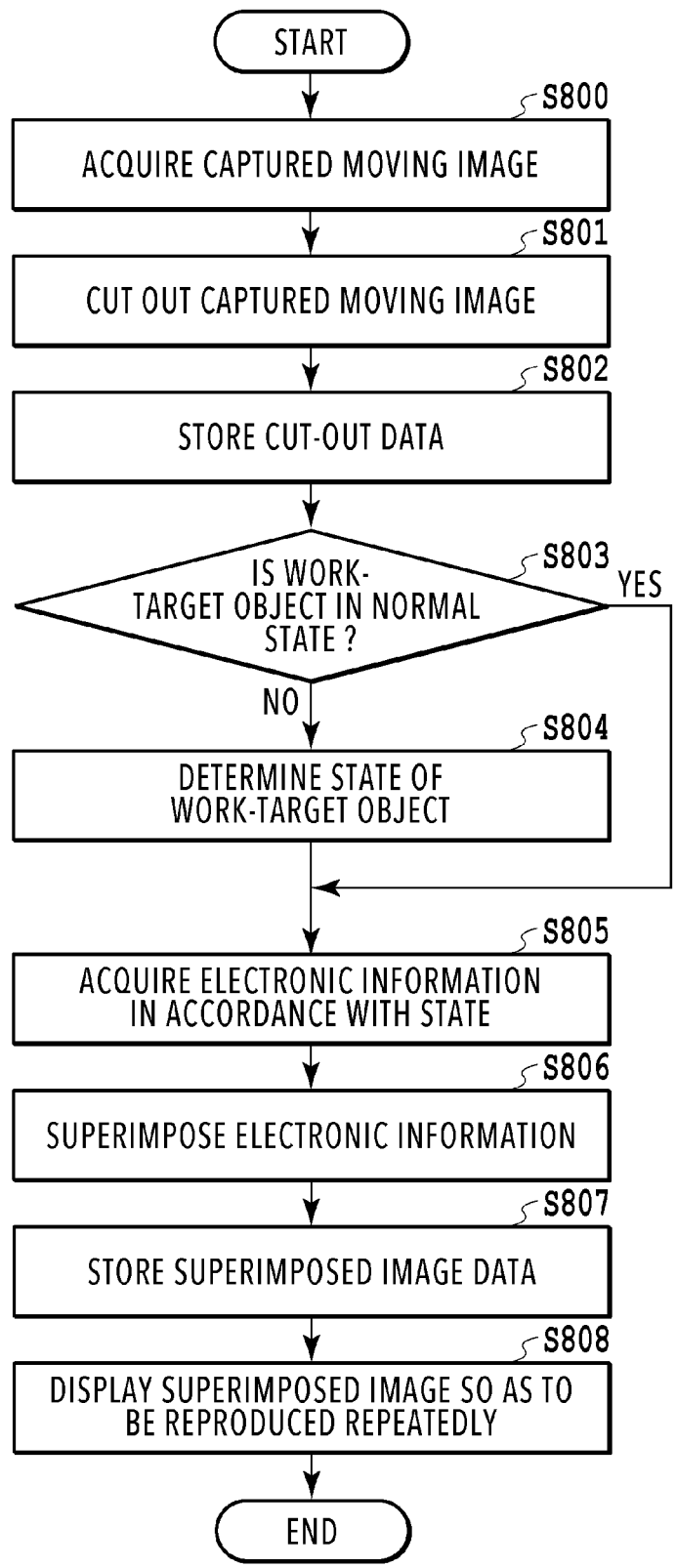
FIG. 8 is a flowchart showing processing until a superimposed image is displayed.

FIG. 8 is a flowchart for explaining processing of the smartphone 110 in the AR reproduction mode. The series of processing shown by the flowchart in FIG. 8 is performed by the CPU of the smartphone 110 loading the program code stored in the ROM onto the RAM and executing the program code. Further, it may also be possible to implement part or all of the functions at the steps in FIG. 8 by hardware, such as an ASIC or an electronic circuit. Symbol "S" in the explanation of each piece of processing means that the step is a step in the flowchart and this also applies to the subsequent flowchart.

This flowchart is started in response to a user giving instructions to start image capturing to the smartphone 110 in the AR reproduction mode of the smartphone 110. It may also be possible for the AR reproduction mode to be started by a user pressing down a start button of the AR reproduction mode, which is displayed on the screen of the smartphone 110. For example, it may also be possible for the AR application described above to display the start button described above. Further, it may also be possible for the AR reproduction mode to be started by the AR application being booted.

At S800, the editing unit 501 gives instructions to start image capturing to the image capturing unit 404 and acquires data on a moving image obtained by the image capturing unit 404 performing image capturing.

At S801, the editing unit 501 cuts out a part of the moving image obtained as a result of the image capturing unit 404 performing image capturing. The image (moving image) that is cut out at this step may be obtained by a frame in which the image forming apparatus 100 is included being selected from the moving image acquired at S800 and the selected frame being cut out.

At S802, the storage management unit 502 temporarily stores the data on the image cut out at S801 in the RAM 402. It may also be possible to store the acquired captured moving image in the RAM 402 as it is without cutting out a part of the captured moving image acquired at S801.

At S803, the determination unit 503 determines whether the image forming apparatus 100 is in the normal state. The normal state refers to, for example, a state that is not abnormal, such as a state where a paper-jamming or the like has not occurred.

As the determination method at this step, for example, whether the state of the image forming apparatus 100 is the normal state is determined based on a different point by comparing the image data on the image forming apparatus 100 in the normal state, which is stored in the ROM 401, and the cut-out image data.

In a case where the image forming apparatus is in an abnormal state (NO at S803), at S804, the determination unit 503 specifies the cause of the occurrence of the abnormality of the image forming apparatus 100 and determines the kind of abnormality that has occurred in the image forming apparatus 100. For example, the determination unit 503 compares the image data on the image forming apparatus 100 in the normal state and the cut-out image data. Then, based on the comparison, the determination unit 503 derives different points, such as a difference between the jammed sheet and the position of the sheet and a difference in the position of the printer head, and determines that the image forming apparatus is in the state where a paper-jamming has occurred based on the different points.

The processing at S803 and S804 may be performed at one step. For example, the determination unit 503 compares the image data on the image forming apparatus 100 in the normal state and the cut-out image data. In a case where the results of the comparison indicate that the state of the image forming apparatus 100 is any one of the states indicating an abnormality, such as a paper-jamming, it may also be possible for the determination unit 503 to determine that the state is the state of the image forming apparatus 100. In a case where it is not determined that the state is any one of the states indicating an abnormality, it may also be possible for the determination unit 503 to determine that the image forming apparatus 100 is in the normal state.

It may also be possible to perform the method of determining whether the state is the normal state at S803 or the method of determining the kind of abnormal state at S804 by image recognition processing using machine learning, such as deep learning. For example, in a case where image recognition is performed by using deep learning, a neural network is prepared in advance, which is a learning model having been caused to learn a large number of images, respectively, in which the image forming apparatus 100, which is the work-target object, is captured. Specifically, in a case where an image is input as input data, this learning model outputs a probability of each state of the image forming apparatus 100 as output data (recognition results). Consequently, the state corresponding to the output value with the highest probability is the analysis results of the image.

In a case where the learning model is caused to learn, as learning data, the image of the image forming apparatus 100 as input data and information indicating each state of the image forming apparatus as training data (correct data) are prepared. Then, by giving the output data (recognition results) that is output by inputting the image, which is the input data, to the learning model, and the training data to a loss function, a shift amount from the correct data on the recognition results is obtained. The connection weighting coefficients or the like between nodes of the neural network in the learning model are updated so that a shift amount L becomes small for a large number of pieces of learning data. The error back-propagation method is a method of adjusting the connection weighting coefficients or the like between the nodes of each neural network so that the above-described error becomes small. As a specific algorithm of machine learning, mention is made of the nearest neighbor method, the Naive Bayes method, the decision tree, the support vector machine and the like. Further, mention is also made of deep learning that generates feature quantities for learning and the connection weighting coefficients by itself by making use of the neural network. It is possible to apply the learning model to the present embodiment by appropriately using an algorithm that can be made use of among the algorithms described above. It may also be possible for the state to be determined and the kind of state to be determined by inputting the image of the image forming apparatus to the learning model thus generated.

At S805, the acquisition unit 504 acquires electronic information on work contents corresponding to the determined state of the image forming apparatus from the ROM 40L For example, in a case where it is determined that the image forming apparatus 100 is abnormal and the type of abnormality is a paper-jamming, the acquisition unit 504 acquires the electronic information, which is information indicating the work contents of a user for eliminating the paper-jamming.

Explanation is given by supposing that the electronic information is, for example, an instructive moving image indicating the work contents, but it may also be possible to use, in addition to a moving image, a three-dimensional model generated by computer graphics, actual image, animation, character information and the like as electronic information.

On the other hand, in a case where it is determined that the image forming apparatus is in the normal state (YES at S803), two cases are considered. The first case is a case where the image forming apparatus 100 is actually in the normal state. The second case is a case where a different portion indicating an abnormal state is not derived because the portion indicating the abnormal state is not captured in the cut-out image, for example, although a paper-jamming has occurred, the portion at which the sheet is jammed is not captured.

Consequently, even though it is determined that the image forming apparatus 100 is in the normal state, there is a possibility that the case is the second case. Because of this, in a case where the image forming apparatus is determined to be in the normal state, at S805, the acquisition unit 504 acquires electronic information for instructing a user to change the portion to be captured of the image forming apparatus 100 so that the portion that specifies the occurrence of an abnormality is captured. For example, in a case where the image forming apparatus 100 is captured in a state where the maintenance cover 101 is closed, electronic information is acquired, which gives instructions to perform image capturing again after opening the maintenance cover 101 so that the sheet 601 that is caught can be seen.

At S806, the superimposing unit 505 generates a superimposed image for giving work instructions to a user by superimposing the electronic information acquired at S805 on the image stored at S802. At S807, the storage management unit 502 stores the generated superimposed image in the RAM 402.

At S808, the display control unit 506 displays the stored superimposed image on the display unit 405 in such a manner that the image is reproduced repeatedly.

The display control unit 506 repeatedly reproduces the generated superimposed image until, for example, the update button 602 is pressed down, or until the AR reproduction mode is terminated. Because of this, even in a case where the image forming apparatus 100 deviates from the image capturing range of the image capturing unit 404 of the smartphone 110, it is possible for a user to perform the work while viewing the superimposed image.

Alternatively, it may also be possible for the superimposed image to be reproduced repeatedly until a predetermined time elapses. For example, in a case where the work-target object is determined to be in the normal state, the possibility that a user has already modified the captured portion in accordance with the instructions shown in the superimposed image. Because of this, in a case where the work-target object is determined to be in the normal state by the determination at S803, it may also be possible to make a transition to S800 after the superimposed image is reproduced repeatedly until a predetermined time elapses at S808.

The electronic information acquired at S805 may be stored in the ROM 401 or the RAM 402. Then, for example, it may also be possible for the display control unit 506 to perform display control so that the image stored at S802 is displayed in such a manner that the image is reproduced repeatedly with the stored electronic information being superimposed thereon. In this case, the processing at S807 can be skipped. In this case also, it is possible to display the superimposed image on the display unit irrespective of the posture of the smartphone 110.

[Updating Processing of Superimposed Image]

Figure 9:
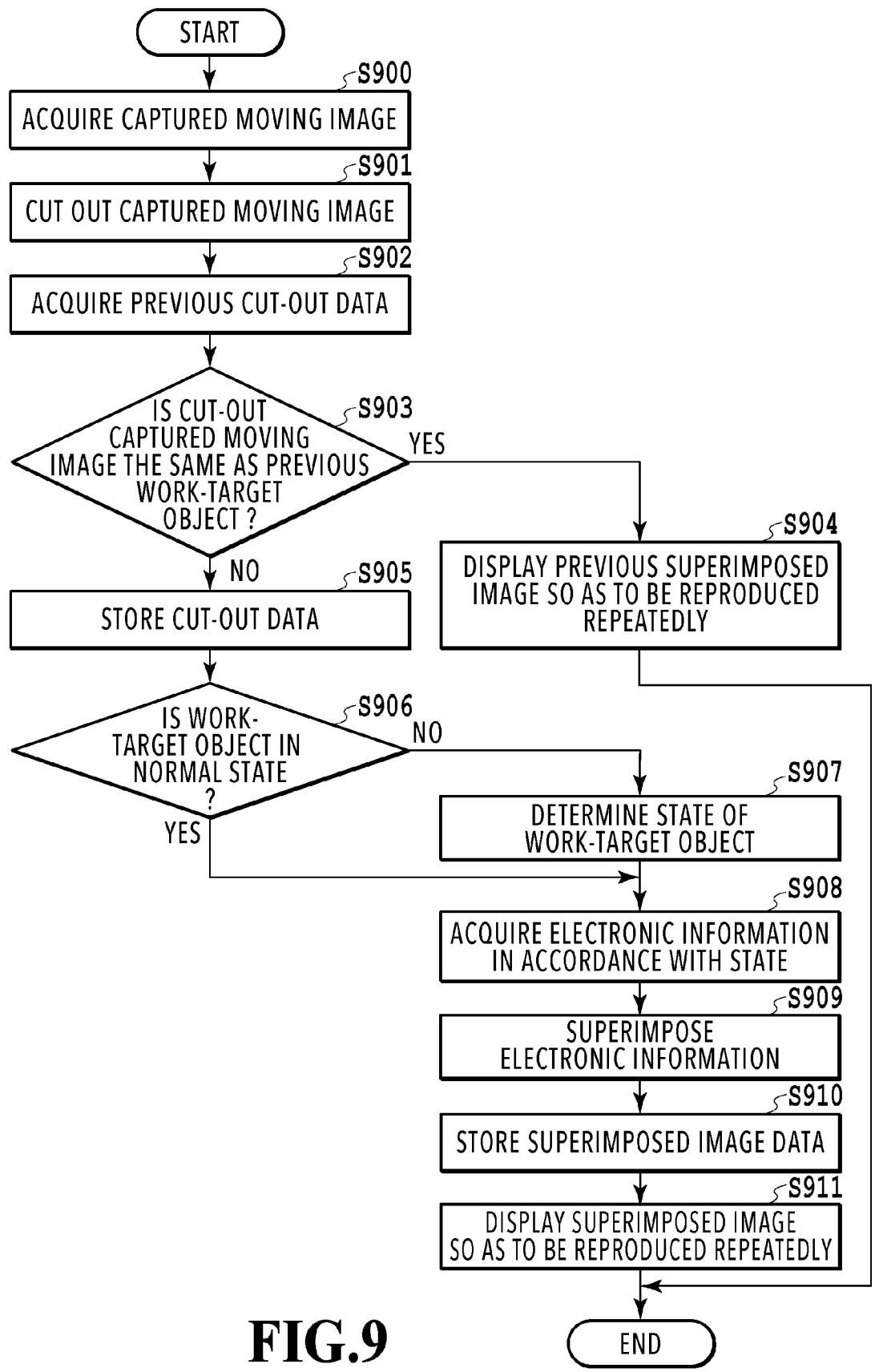
FIG. 9 is a flowchart showing updating processing.

In a case where the update button 602 is pressed down by a user while the superimposed image is being reproduced repeatedly at S808, processing to update the superimposed image that is reproduced repeatedly is performed. FIG. 9 is a flowchart showing details of the updating processing.

At S900, the editing unit 501 acquires data on a moving image obtained by giving instructions to start image capturing to the image capturing unit 404 and the image capturing unit 404 performing image capturing.

At S901, the editing unit 501 cuts out a part of the moving image obtained by the image capturing unit 404 performing image capturing. The processing at this step is the same as that at S801.

At S902, the editing unit 501 acquires data on the image (moving image) cut out from the captured moving image of the previous time, which is an image portion other than the electronic information on the previous superimposed image stored at S802.

At S903, the editing unit 501 determines whether the state and the captured portion of the image forming apparatus 100 are the same by comparing the image (moving image) acquired at S902 which is cut out from the captured moving image of the previous time and the image (moving image) cut out at S901. The method of determination is performed by, for example, comparing the acquired data on the image cut out the previous time and the data on the image cut out at S901 and determining whether they are the same based on the different portions between the two images.

In a case where it is determined that they are the same at SM, the display control unit 506 acquires the data on the superimposed image of the previous time at S904 and causes the display unit 405 to display the acquired superimposed image in such a manner that the superimposed image is reproduced repeatedly. That is, in a case where the state of the image forming apparatus 100 is the same as that before the update button 602 is pressed down and the captured portion remains unchanged, it is not necessary to update the superimposed image. Because of this, at this step, the superimposed image is not updated and the superimposed image of the previous time is displayed in such a manner that the superimposed image is reproduced repeatedly.

On the other hand, in a case where it is determined that they are not the same at S903, the storage management unit 502 stores, at S905, the image (moving image) cut out from the moving image at S901. Then, at S906 to S911, a superimposed image is generated anew based on the image (moving image) cut out this time and the generated superimposed image is displayed repeatedly. The processing at S906 to S911 is the same as the processing at S803 to S808, and therefore, explanation is omitted.

In a case where the update button 602 is pressed down while the superimposed image is being displayed at S911 or S904, the processing of this flowchart is performed again. Because of this, it is made possible for the superimposed image showing the next work to be displayed by the updating processing of this flowchart being performed in a case where a user completes the work shown in the superimposed image currently being reproduced.

[About Work-Target Object]

Explanation is given on the assumption that the work-target object in the work instruction system 130 is the image forming apparatus 100, but the work-target object is not limited to the image forming apparatus 100.

Figure 10:
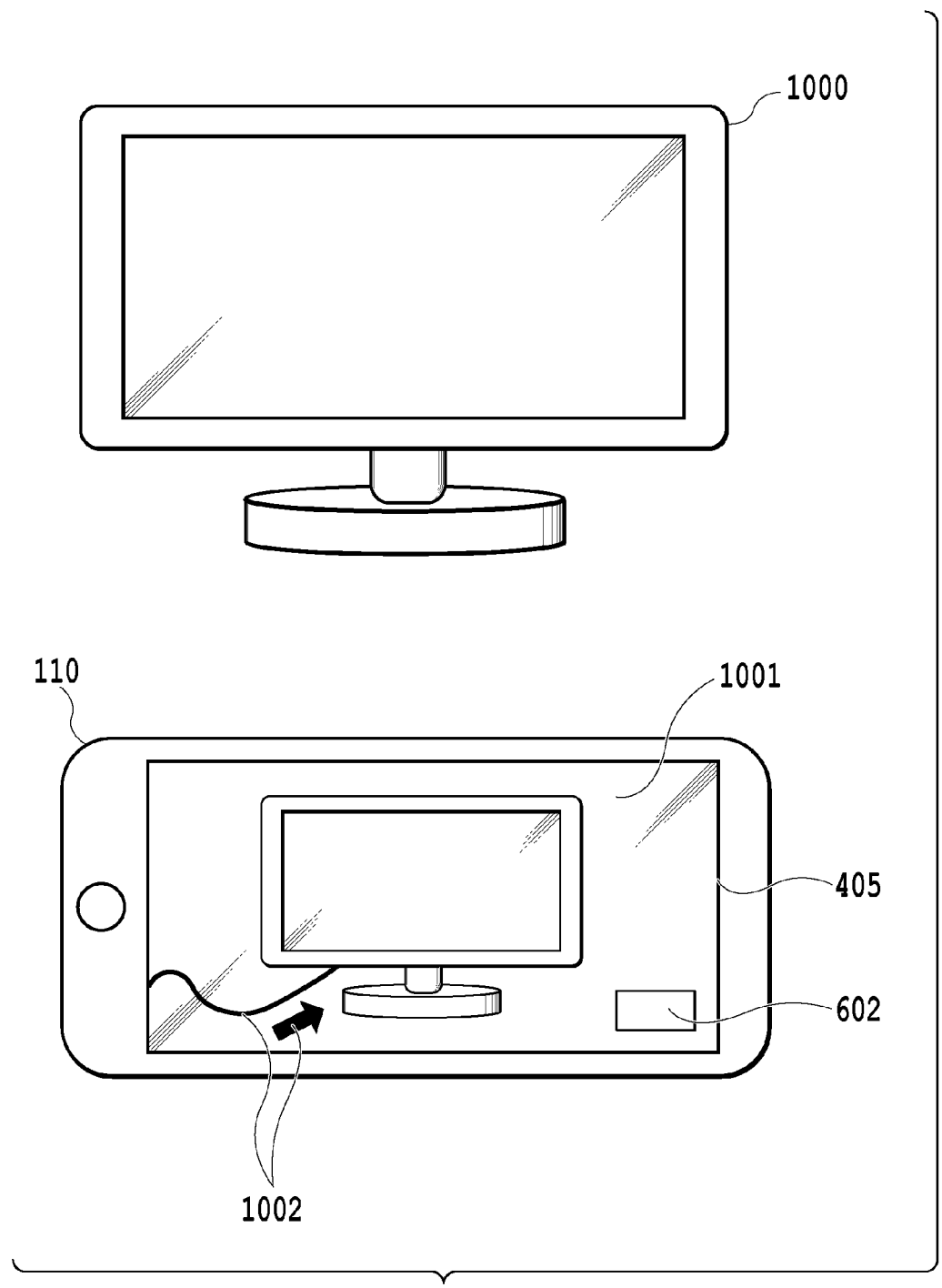
FIG. 10 is a diagram showing the multi function mobile terminal that is performing image capturing in the AR reproduction mode.

FIG. 10 is a diagram showing an application example of the present embodiment in a case where the work-target object is a display apparatus 1000. The display apparatus 1000 in FIG. 10 is a display apparatus in which the manual work for a user to connect the display apparatus to an electric power source has occurred. On the display unit 405 of the smartphone 110 that is capturing the display apparatus 1000, a superimposed image 1001 on which electronic information 1002 indicating the work contents is superimposed is displayed in such a manner that the superimposed image 1001 is reproduced repeatedly. The processing to cause the display unit 405 of the smartphone 110 to display the image showing the work contents is the same as that of the flow in FIG. 8.

As the method of identifying a work-target object, for example, it may be possible to identify the type of the work-target object by reading the identifier attached to the work-target object to acquire product information on the work-target object. Alternatively, it may also be possible to identify the work-target object by image recognition processing using machine learning, such as deep learning. Alternatively, it may also be possible to identify the work-target object based on information on the work-target object, which is input by a user.

As described above, even though the work-target object is an apparatus other than the image forming apparatus 100, according to the present embodiment, it is possible to display a superimposed image showing the work contents even in a case where the work-target object deviates from the image capturing range of the image capturing unit 404 of the smartphone 110.

[About Switch of Mode]

The AR reproduction mode may have, in addition to the mode (described as first mode) in which the stored superimposed image as described above is repeatedly reproduced and displayed, a mode (described as second mode) in which a captured image currently being captured by the image capturing unit is displayed with electronic information in accordance with the captured image being superimposed thereon. Then, the smartphone 110 may have a switch unit, not shown schematically, configured to switch between the first mode and the second mode.

For example, the switch unit, not shown schematically, determines whether a work-target object is included currently in the image capturing range of the image capturing unit 404. In a case of determining that no work-target object is included, the switch unit switches the mode to the first mode and the display control unit 506 displays the stored superimposed image in such a manner that the superimposed image is reproduced repeatedly.

On the other hand, in a case of determining that a work-target object is included in the image capturing range of the image capturing unit 404, the switch unit switches the mode to the second mode and the display control unit 506 displays the captured image currently being captured by the image capturing unit 404 on the display unit 405 with electronic information in accordance with the captured image being superimposed thereon.

It may also be possible for the determination of whether a work-target object is included in the image capturing range to be performed at predetermined time intervals. For example, in a case where it is determined that a work-target object is included in the image capturing range in the first mode, it may also be possible to switch the mode and perform the operation in the second mode in which the captured image currently being captured by the image capturing unit is displayed on the display unit 405 with electronic information being superimposed thereon. In the method of determining whether the work-target object has deviated from the image capturing range of the image capturing unit 404, determination is performed by comparing the image in which the work-target object is included and the captured image currently being captured by the image capturing unit.

As explained above, according to the present embodiment, irrespective of the posture of the information processing apparatus having the image capturing unit, it is possible to display an image in which electronic information is superimposed on an object on the display unit of the information processing apparatus. Because of this, in a case where a work-target object (for example, the image forming apparatus 100) is included in the image capturing range of the image capturing unit 404 and even in a case where the work-target object deviates from the image capturing range of the image capturing unit 404, it is possible to display an image in which electronic information is superimposed on the object on the display unit of the information processing apparatus.

OTHER EMBODIMENTS

The work instruction system 130 may have an information processing apparatus (server) separate from the smartphone 110 having a part or all of the functions in FIG. 3. For example, in the embodiment described above, explanation is given on the assumption that the smartphone 110, which is an information processing apparatus, performs the processing at all the steps of the flowcharts in FIG. 8 and FIG. 9, In addition, part of the processing of the flowcharts in FIG. 8 and FIG. 9 may be performed by the server of the work instruction system 130. For example, in the flowchart in FIG. 8, it may also be possible for the server to acquire a moving image captured by the smartphone 110, cut out a part of the acquired moving image, determine the state of the image forming apparatus 100, and transmit electronic information based on the determined state to the smartphone 110. Then, an aspect may also be accepted in which the smartphone 110 acquires the electronic information transmitted from the server at S805.

Alternatively, it may also be possible for the server to generate a superimposed image by superimposing the electronic information determined based on the state of the image forming apparatus 100 on the cut-out image and transmit the generated superimposed image to the smartphone 110. Then, it may also be possible for the smartphone 110 to acquire the superimposed image from the server in place of generating the superimposed image at S806.

According to the technique of the present disclosure, irrespective of the posture of the information processing apparatus, it is possible to display an image in which electronic information is superimposed on an object.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-239134, filed Dec. 27, 2019, which is hereby incorporated by reference wherein in its entirety.

What is claimed is:

1. An information processing method comprising:
acquiring an image captured by an image capturing unit of an information processing apparatus;
determining a state of an object included in the acquired captured image;
acquiring a superimposed image in which electronic information corresponding to the image of the object captured by the image capturing unit is superimposed on the image;
storing the superimposed image in a storage; and
displaying the superimposed image stored in the storage on a display of the information processing apparatus, wherein p1 even in a case where the object is not included in an image capturing range of the image capturing unit, the superimposed image stored in the storage is displayed on the display, and
displaying the superimposed image is continued until the determined state of the object satisfies a predetermined condition and the superimposed image is switched to a different image based on the determined state of the object satisfying the predetermined condition,
wherein in a case where it is determined that the state of the object is a state that is not abnormal, the acquired electronic information is information instructing a user to change a portion to be captured of the object.

2. The information processing method according to claim 1, wherein
the state is determined based on different portions obtained as a result of comparing an image of the object in a state that is not abnormal and the image of the object captured by the image capturing unit.

3. The information processing method according to claim 1, further comprising
determining the kind of abnormality in a case where the state of the object is abnormal, wherein
the acquired electronic information is information indicating work contents for eliminating the abnormality.

4. The information processing method according to claim 3, wherein it is determined that the state of the object is abnormal if a paper-jamming has occurred in the object.

5. The information processing method according to claim 1, further comprising:
acquiring data on a moving image captured by the image capturing unit; and
cutting out a part of frames configuring the moving image, wherein
the image of the object based on image capturing by the image capturing unit is a cut-out frame.

6. The information processing method according to claim 1, wherein
the acquired electronic information is information indicating work contents of a user in accordance with a state of the object.

7. The information processing method according to claim 1, further comprising:
performing processing to, in a case where a predetermined operation of a user is received, update the superimposed image that is reproduced repeatedly on a display unit.

8. The information processing method according to claim 7, wherein
the display is a touch panel and
a button for receiving the predetermined operation is displayed on the display.

9. The information processing method according to claim 7, further comprising
processing to update the superimposed image is performed in a case where the image of the object captured after the predetermined operation is received is not the same as the image of the object used to display the superimposed image that has been displayed on the display before the predetermined operation is received.

10. The information processing method according to claim 1, wherein the acquired electronic information is displayed as a moving image and is repeatedly reproduced until the determined state satisfies the predetermined condition.

11. The information processing method according to claim 1, wherein the different image is an image generated by superimposing electronic information corresponding to a state satisfying the predetermined condition.

12. The information processing method according to claim 1, wherein the predetermined condition is removal of an error occurring in the object included in the captured image.

13. The information processing method according to claim 1 further comprising:
storing the generated superimposed image in a storage,
wherein the displayed superimposed image is the superimposed image stored in the storage.

14. An information processing apparatus having an image capturing unit configured to capture image and a display, the apparatus comprising:
at least one processor and at least a memory coupled to the at least one processor and having instructions stored thereon, and when executed by the at least one processor, acting as:
a determining unit configured to determine a state of an object included in the acquired image;
an acquisition unit configured to acquire a superimposed image in which electronic information corresponding to the image of the object captured by the image capturing unit is superimposed on the image;
storing unit configured to store the superimposed image in a storage;
and
a display control unit configured to display the superimposed image stored in the storage unit on the display, wherein even in a case where the object is not included in an image capturing range of the image capturing unit, the display control unit displays the superimposed image stored in the storage unit displaying the superimposed image is continued until the determined state of the object satisfies a predetermined condition and the superimposed image is switched to a different image based on the determined state of the object satisfying the predetermined condition,
wherein in a case where it is determined that the state of the object is a state that is not abnormal, the acquired electronic information is information instructing a user to change a portion to be captured of the object.

15. A non-transitory computer readable storage medium storing a program which causes a computer to perform an information processing method comprising:
acquiring an image captured by an image capturing unit of the information processing apparatus;
determining a state of an object included in the acquired captured image acquiring a superimposed image in which electronic information corresponding to the image of the object captured by the image capturing unit is superimposed on the image;
storing the superimposed image in a storage; and
displaying the superimposed image stored in the storage on a display of the information processing apparatus, wherein, even in a case where the object is not included in an image capturing range of the image capturing unit, the superimposed image stored in the storage is displayed on the display, and displaying the superimposed image is continued until the determined state of the object satisfies a predetermined condition and the superimposed image is switched to a different image based on the determined state of the object satisfying the predetermined condition,
wherein in a case where it is determined that the state of the object is a state that is not abnormal, the acquired electronic information is information instructing a user to change a portion to be captured of the object.

* * * * *